United States Patent

[11] 3,537,592

[72] Inventors Hubert S. Ogden
Hollywood, and
Stanley D. Odgen, Glendale, California
[21] Appl. No. 748,540
[22] Filed July 29, 1968
[45] Patented Nov. 3, 1970
[73] Assignee Ogden Filter Co., Inc.,
Los Angeles, California
a corporation of California

[54] CARTRIDGE OF SPACED WALL FILTER ELEMENTS AND SPACERS
3 Claims, 7 Drawing Figs.
[52] U.S. Cl. .................................................. 210/343,
210/345, 347, 486
[51] Int. Cl. ............................................. B01d 25/02
[50] Field of Search ...................................... 210/343,
345, 346, 347, 486, 488, 492, 456

[56] References Cited
UNITED STATES PATENTS

| | | | |
|---|---|---|---|
| 1,015,326 | 1/1912 | Kiefer | 210/343 |
| 2,304,618 | 12/1942 | Williams | 210/347 |
| 2,392,354 | 1/1946 | Alsop | 210/347 |
| 2,472,012 | 5/1949 | Hanneman | 210/486X |
| 2,639,251 | 5/1953 | Kracklauer | 210/347X |
| 2,902,164 | 9/1959 | Durnauf | 210/486 |
| 3,083,834 | 4/1963 | Pall | 210/343X |
| 3,209,915 | 10/1965 | Gutkowski | 210/492X |
| 3,294,241 | 12/1966 | Sicard et al. | 210/343X |

FOREIGN PATENTS

| | | | |
|---|---|---|---|
| 1,151,439 | 8/1957 | France | 210/486 |
| 915,341 | 1/1963 | Great Britain | 210/486 |
| 919,385 | 2/1963 | Great Britain | 210/486 |

*Primary Examiner*—Reuben Friedman
*Assistant Examiner*—Frank A. Spear, Jr.
*Attorney*—Jackson and Jones

ABSTRACT: A liquid filter element for removing foreign matter from liquid such as water is disclosed. The filter element includes a pair of annular fibre mats separated by a screen partition. An impermeable plastic material bonds the periphery of the mats together to provide a unitary element and prevents leakage of liquid between the interior surfaces of the mats at the periphery thereof. A plurality of the mats may be placed around a perforated sleeve and between a pair of compression plates to form a replaceable filter cartridge.

Patented Nov. 3, 1970

INVENTORS.
HUBERT S. OGDEN
STANLEY D. OGDEN
BY Jackson + Jones
ATTORNEYS.

Patented Nov. 3, 1970

INVENTORS.
HUBERT S. OGDEN
STANLEY D. OGDEN

BY Jackson & Jones
ATTORNEYS.

CARTRIDGE OF SPACED WALL FILTER ELEMENTS AND SPACERS

BACKGROUND OF THE INVENTION

Liquid filter elements are used in a wide variety of applications to filter foreign matter and other contamination from liquids or gases. The present invention relates to replaceable filter cartridges for purifying drinking water and to filter pads for use therein.

One prior art filter cartridge to which this invention is particularly adapted comprises a plurality of annular filter pads surrounding a perforated open-ended sleeve and stacked between a pair of annular compression plates. The individual filter pads are formed by a pair of annular fibrous mats with a partition screen secured between the mats. Untreated water passes through the exterior surface of the filter pads, through the screen and then into the open-ended sleeve where the purified water is drained. The pair of mats of each pad are mechanically secured together along the periphery thereof to insure that the contaminated water does not flow directly into the screen but is purified by passing through one of the mats. In the past the mats of each filter pad have been secured together along their periphery by staples or stitches.

The staples or stitches must place the fibrous material in compression around the entire periphery of the filter pad to prevent leakage. This operation requires the use of a special machine during the manufacturing process. Furthermore, the fibrous material of the mats is easily torn and the stitching or stapling operation may damage the pads and preclude their safe use. This has necessitated a close quality control during the manufacture of the pads to prevent any of the damaged pads from being used in a filter.

The peripheral edge portion of the finished prior art pads is unprotected and may be pulled from the staples or stitches when a filter cartridge incorporating the pads is handled during replacement.

SUMMARY OF THE INVENTION

In accordance with the present invention, a filter cartridge is provided which includes a plurality of filter pads disposed around a perforated sleeve and between a pair of compression plates. Each of the filter pads includes a pair of annular fibre mats with an annular partition member such as a screen disposed between the mats. An impermeable material such as plastic bonds the periphery of the pair of mats together to prevent leakage of liquid between the inner peripheral surfaces of the mats while providing a strong and reliable unitary element.

DESCRIPTION OF THE PREFERRED EMBODIMENTS

Figure 3:
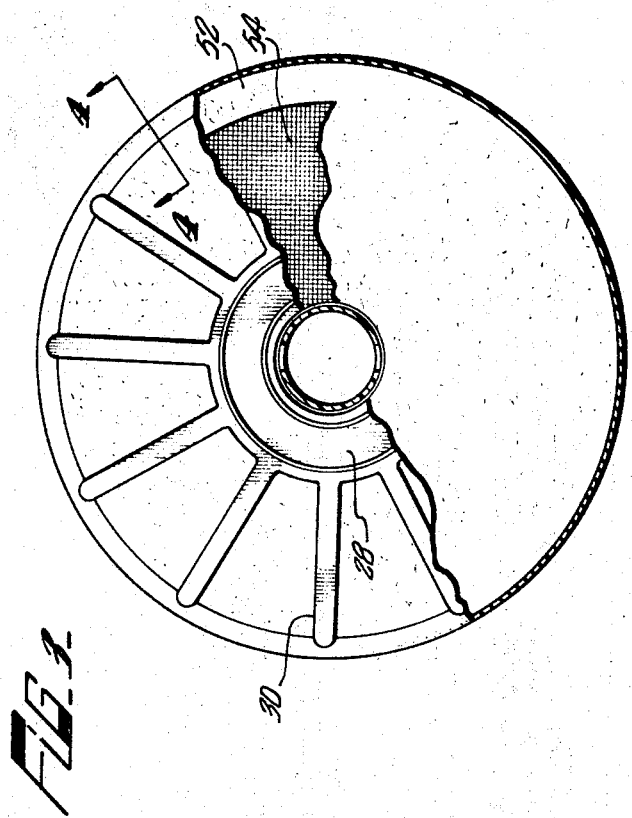
FIG. 3 is a view taken along the section 3-3 of FIG. 2.
Figure 4:
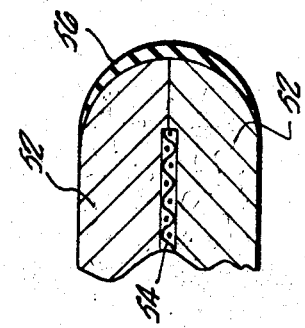
FIG. 4 is an enlarged sectional view of the peripheral portion of the filter pad taken along line 4-4 of FIG. 3.
Figure 1:
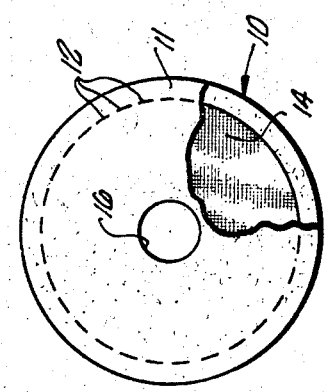
FIG. 1 is a plan view partially broken away of a filter pad constructed in accordance with the teachings of the prior art.
Figure 2:
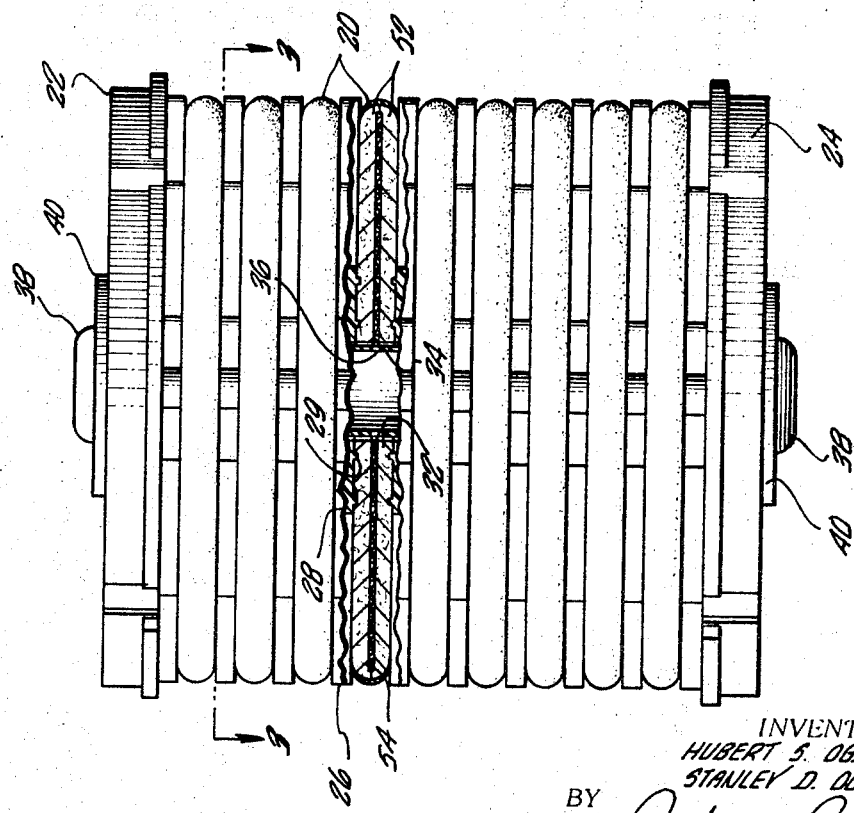
FIG. 2 is an elevation view partly broken away of a filter cartridge embodying the principles of the present invention.
Figure 5:
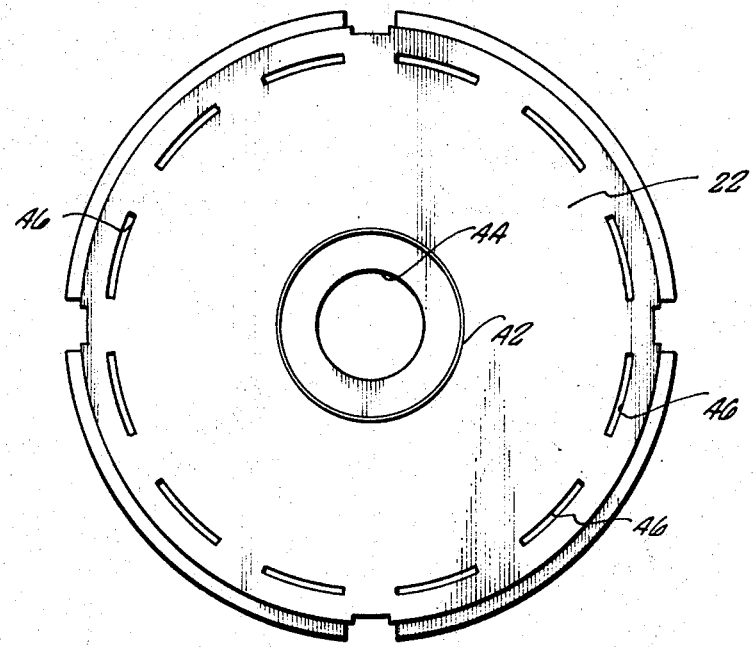
FIG. 5 is a top plan view of one of the compression plates utilized in the filter cartridge.
Figure 7:
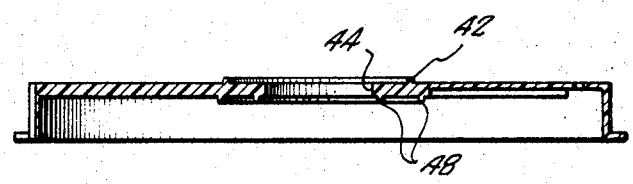
FIG. 7 is a sectional view taken along line 7-7 of FIG. 6.
Figure 6:
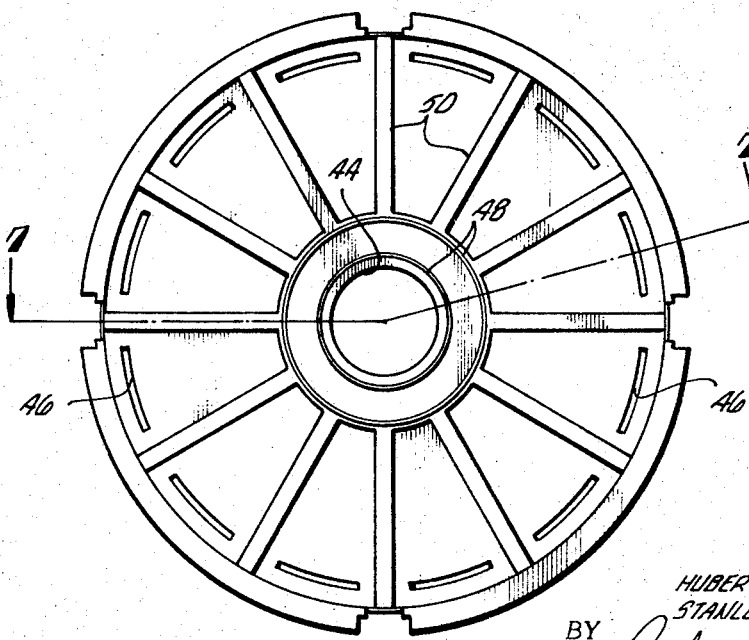
FIG. 6 is a bottom view of the compression plate shown in FIG. 5.

Referring now to the drawings, and particularly FIG. 1, there is shown in plan view a prior art filter pad 10 in which a pair of fibrous mats 11 are fastened together along the peripheral edge by staples 12. An annular partition screen 14 is disposed between the mats for draining the filtered liquid into the central opening 16. A number of filter pads are stacked on a perforated sleeve to form a cartridge as illustrated in FIG. 2 so that the purified liquid reaching the partition screen 14 will flow into the interior of the sleeve. Such a filter cartridge may be placed in a suitable housing, for example, of the type disclosed in U.S. Pat. No. 2,627,351 which issued to H. S. Ogden on Feb. 3, 1953. Water to be filtered flows into a chamber within the housing which surrounds the cartridge unit through a suitable inlet opening. Purified water is drained from the perforated sleeve through an outlet opening.

Referring now to FIG. 2, there is shown a replaceable filter cartridge constructed in accordance with the present invention in which a plurality of filter pads 20 are stacked between a pair of identical annular compression plates 22 and 24. A plastic spacer 26 having a hub portion 28 and radially extending arms 30 is disposed between each filter pad 20. The spacers 26 expose a very substantial portion of the exterior surface of the filter pads 20 to the liquid such as water surrounding the cartridge unit. The filter pads have a central opening 32 which surrounds a free sleeve 34 having perforations 36. The sleeve 36 may be made of plastic and includes a pair of shoulders 38 at each end thereof as shown. A flexible sealing member 40 is disposed between each shoulder 38 and the respective compression plate to secure the cartridge together. The spacers 26 are provided with annular or circular projecting ribs 29 which compress the inner portion of the filter pads surrounding the sleeve 34 to prevent water from leaking into the sleeve along the exterior surface of the pads. The compression plates 22 and 24 are provided with an outwardly extending circular rib 42 which is pressed against the interior surface of the sealing member 42 to prevent leakage. The compression plates are provided with annularly arranged openings 46 for directing water to the exterior surface of the outermost filter pads. The compression plates are also provided with a pair of circular ribs 48 on the interior surfaces thereof for compressing the inner portion of the adjacent filter pads. A plurality of radially extending arms 50 are formed integrally on the inner surface of the compression plates and function in the same manner as the arms 30 of the spacers 28.

Each of the filter pads includes a pair of annular fibre mats 52 and a plastic partition screen 54 carried between the mats to drain purified water that has passed through the mats into the sleeve 34. An impermeable material 56 such as a plastisol is bonded to the periphery of the annular mats 52 of each filter pad to secure the peripheral portion together and provide a rugged unitary construction. The plastic coating 56 also eliminates leakage between the interior surfaces of the pads at the periphery thereof. The coating 56 may be easily applied by rolling the pads through a bath of a suitable liquid plastic material which will solidify. The coating 56 may also comprise a suitable nonplastic material such as cement, rubber, etc.

A rugged, inexpensive and reliable filter cartridge unit and filter pad for use therein has been described. The filter unit provides complete filtration and purification of water at a very modest cost. After the unit has lost its efficiency due to the accumulation of impurities, it may be easily replaced by a new unit. Various modifications of the preferred embodiment will be evident to those skilled in the art without departing from the scope of the present invention.

I claim:

1. In a filter cartridge for filtering contaminates from a liquid the combination which comprises:
    a perforated open-ended sleeve;
    an annular compression plate surrounding the sleeve at each end thereof;
    a plurality of filter pads disposed between the plates and surrounding the sleeve, each of the filter pads including a pair of annular fibre mats, an annular partition disposed between the mats and an impermeable material bonding the periphery of the mats together to prevent leakage of liquid between the inner peripheral surfaces of the mats; and
    a spacer disposed between each filter pad for exposing a major portion of the exterior surface of each filter pad to the liquid, the spacer comprising an annular hub portion and a plurality of radial arms extending to the periphery of the pads, the spacer further including a circular rib projecting axially from each side of the annular hub portion which is adapted to compress the inner peripheral portion of the filter pads to prevent liquid from leaking into the sleeve along the exterior of the pads.

2. The combination as defined in claim 1 wherein the partition is a screen and the impermeable material is a plastic.

3. The combination as defined in claim 2 wherein the plastic is plastisol.